US012723543B1

(12) United States Patent
Barbu et al.

(10) Patent No.: US 12,723,543 B1
(45) Date of Patent: Sep. 1, 2026

(54) HEAT EXCHANGER ASSEMBLY WITH A BYPASS STRUCTURE

(71) Applicants: General Electric Company, Evendale, OH (US); General Electric Deutschland Holding GmbH, Frankfurt (DE)

(72) Inventors: Viorel-Marian Barbu, Unterschleissheim (DE); Hojjat Nasr, West Chester, OH (US); Michael Vadnais, Delafield, WI (US); Atanu Saha, Bangalore (IN); Ashutosh Sinha, Bangalore (IN); Kevin Edward Hinderliter, Cincinnati, OH (US)

(73) Assignees: General Electric Company, Evendale, OH (US); General Electric Deutschland Holding GmbH, Frankfurt (DE)

( * ) Notice: Subject to any disclaimer, the term of this patent is extended or adjusted under 35 U.S.C. 154(b) by 0 days.

(21) Appl. No.: 19/226,656

(22) Filed: Jun. 3, 2025

(51) Int. Cl.
*F02C 7/00* (2006.01)

(52) U.S. Cl.
CPC ............ *F02C 7/00* (2013.01); *F05D 2260/20* (2013.01); *F05D 2260/606* (2013.01)

(58) Field of Classification Search
CPC ........ F28D 1/0246; F28D 1/0286; F28D 1/03; F28D 1/04; F28D 1/0316; F28D 1/0325
See application file for complete search history.

(56) References Cited

U.S. PATENT DOCUMENTS

| | | | |
|---|---|---|---|
| 2,474,258 | A | 6/1949 | Kroon |
| 2,999,630 | A | 9/1961 | Warren et al. |
| 3,034,770 | A | 5/1962 | Hiersch |
| 3,064,947 | A | 11/1962 | McNab |
| 3,528,250 | A | 9/1970 | Johnson |
| 3,540,682 | A | 11/1970 | Dibble et al. |
| 3,542,152 | A | 11/1970 | Adamson et al. |
| 3,735,588 | A | 5/1973 | Moskowitz et al. |
| 3,750,402 | A | 8/1973 | Vdoviak et al. |
| 3,981,466 | A | 9/1976 | Shah |
| 4,010,608 | A | 3/1977 | Simmons |

(Continued)

FOREIGN PATENT DOCUMENTS

| | | | |
|---|---|---|---|
| CN | 1204005 | A | 1/1999 |
| CN | 201215415 | Y | 4/2009 |

(Continued)

OTHER PUBLICATIONS

Crigler, Application of Theodorsen's Theory to Propeller Design, NACA (National Advisory Committee for Aeronautics) Report 924, 1948, pp. 83-99.

(Continued)

*Primary Examiner* — Phutthiwat Wongwian
*Assistant Examiner* — Jacek Lisowski
(74) *Attorney, Agent, or Firm* — Dority & Manning, P.A.

(57) ABSTRACT

A heat exchanger assembly includes an inlet manifold, an outlet manifold, a plate extending from the inlet manifold to the outlet manifold, the plate defining a plate channel, a bypass structure defining a bypass channel in fluid communication with the outlet manifold and with a heated fluid supply, and a fin extending between the bypass channel and the plate, the fin defining a fin channel fluidly connecting the bypass channel to the plate channel.

13 Claims, 11 Drawing Sheets

(56) References Cited

U.S. PATENT DOCUMENTS

| | | | |
|---|---|---|---|
| 4,043,121 | A | 8/1977 | Thomas et al. |
| 4,090,555 | A | 5/1978 | Anderson et al. |
| 4,187,675 | A | 2/1980 | Wakeman |
| 4,446,696 | A | 5/1984 | Sargisson et al. |
| 4,486,146 | A | 12/1984 | Campion |
| 4,569,199 | A | 2/1986 | Klees et al. |
| 4,607,657 | A | 8/1986 | Hirschkron |
| 4,784,575 | A | 11/1988 | Nelson et al. |
| 4,796,424 | A | 1/1989 | Farrar et al. |
| 4,858,678 | A | 8/1989 | Ladd |
| 4,860,537 | A | 8/1989 | Taylor |
| 4,892,269 | A | 1/1990 | Greco et al. |
| 4,907,946 | A | 3/1990 | Ciokajlo et al. |
| 4,916,894 | A | 4/1990 | Adamson et al. |
| 4,941,803 | A | 7/1990 | Wainauski et al. |
| 4,976,102 | A | 12/1990 | Taylor |
| 5,054,998 | A | 10/1991 | Davenport |
| 5,190,441 | A | 3/1993 | Murphy et al. |
| 5,197,855 | A | 3/1993 | Magliozzi et al. |
| 5,259,187 | A | 11/1993 | Dunbar et al. |
| 5,261,227 | A | 11/1993 | Giffin, III |
| 5,345,760 | A | 9/1994 | Giffin, III |
| 5,386,689 | A | 2/1995 | Bozich et al. |
| 5,457,346 | A | 10/1995 | Blumberg et al. |
| 5,924,479 | A | 7/1999 | Egbert |
| 5,950,308 | A | 9/1999 | Koff et al. |
| 6,082,670 | A | 7/2000 | Chapman |
| 6,302,197 | B1 | 10/2001 | Hornby et al. |
| 6,339,927 | B1 | 1/2002 | DiPietro, Jr. |
| 6,547,518 | B1 | 4/2003 | Czachor et al. |
| 6,763,654 | B2 | 7/2004 | Orlando et al. |
| 6,792,758 | B2 | 9/2004 | Dowman |
| 6,904,963 | B2 | 6/2005 | Hu |
| 6,905,303 | B2 | 6/2005 | Liu et al. |
| 6,997,143 | B2 | 2/2006 | Piccirilli et al. |
| 7,077,193 | B2 | 7/2006 | Kamiyama et al. |
| 7,377,098 | B2 | 5/2008 | Walker et al. |
| 7,506,683 | B2 | 3/2009 | Hu |
| 7,559,191 | B2 | 7/2009 | Parks |
| 7,607,308 | B2 | 10/2009 | Kraft et al. |
| 7,658,063 | B1 | 2/2010 | Matheny |
| 7,726,935 | B2 | 6/2010 | Johnson |
| 7,762,766 | B2 | 7/2010 | Shteyman et al. |
| 7,823,347 | B1 | 11/2010 | Blinn |
| 7,823,374 | B2 | 11/2010 | Venkataramani et al. |
| 7,845,189 | B2 | 12/2010 | Bauer |
| 8,020,524 | B2 | 9/2011 | Miyagawa |
| 8,167,239 | B2 | 5/2012 | Guering et al. |
| 8,251,308 | B2 | 8/2012 | Choi |
| 8,256,202 | B1 | 9/2012 | Paulino |
| 8,276,392 | B2 | 10/2012 | van der Woude |
| 8,382,430 | B2 | 2/2013 | Parry et al. |
| 8,387,362 | B2 | 3/2013 | Storage et al. |
| 8,459,035 | B2 | 6/2013 | Smith et al. |
| 8,689,538 | B2 | 4/2014 | Sankrithi et al. |
| 8,702,378 | B2 | 4/2014 | Foster |
| 8,762,766 | B2 | 6/2014 | Ferguson et al. |
| 8,786,266 | B2 | 7/2014 | Deval et al. |
| 8,844,264 | B2 | 9/2014 | Khalid |
| 8,876,465 | B2 | 11/2014 | Stretton |
| 8,910,465 | B2 | 12/2014 | Snyder |
| 8,943,796 | B2 | 2/2015 | McCaffrey |
| 8,961,114 | B2 | 2/2015 | Ruthemeyer |
| 8,967,967 | B2 | 3/2015 | Stretton et al. |
| 9,017,028 | B2 | 4/2015 | Fabre |
| 9,045,996 | B2 | 6/2015 | Anghel et al. |
| 9,057,328 | B2 | 6/2015 | Kupratis |
| 9,096,312 | B2 | 8/2015 | Moxon |
| 9,097,134 | B2 | 8/2015 | Ferch et al. |
| 9,242,721 | B2 | 1/2016 | Neuteboom |
| 9,249,730 | B2 | 2/2016 | Bourassa et al. |
| 9,422,063 | B2 | 8/2016 | Diaz |
| 9,534,538 | B1 | 1/2017 | Cerny |
| 9,587,532 | B1 * | 3/2017 | Au ........................ F01M 5/002 |
| 9,593,594 | B2 | 3/2017 | Diaz et al. |
| 9,658,005 | B2 | 5/2017 | Elder |
| 9,677,501 | B2 | 6/2017 | Pierluissi et al. |
| 9,683,547 | B2 | 6/2017 | Kim et al. |
| 9,702,630 | B2 | 7/2017 | Whaites et al. |
| 9,759,160 | B2 | 9/2017 | Sankrithi et al. |
| 9,771,867 | B2 | 9/2017 | Karam et al. |
| 9,777,963 | B2 | 10/2017 | Martinez et al. |
| 9,797,310 | B2 | 10/2017 | Ekanayake et al. |
| 9,835,380 | B2 | 12/2017 | Kupiszewski et al. |
| 9,845,768 | B2 | 12/2017 | Pesyna et al. |
| 9,982,555 | B2 | 5/2018 | Thet et al. |
| 9,995,314 | B2 | 6/2018 | Miller et al. |
| 10,036,329 | B2 | 7/2018 | Suciu |
| 10,077,660 | B2 | 9/2018 | Hoefer et al. |
| 10,090,676 | B2 | 10/2018 | Knowles et al. |
| 10,126,062 | B2 | 11/2018 | Cerny et al. |
| 10,184,400 | B2 | 1/2019 | Cerny et al. |
| 10,202,865 | B2 | 2/2019 | Breeze-Stringfellow et al. |
| 10,227,950 | B1 | 3/2019 | Dyson, Jr. |
| 10,253,648 | B2 | 4/2019 | Bentley et al. |
| 10,260,419 | B2 | 4/2019 | Cerny et al. |
| 10,263,550 | B2 | 4/2019 | Thet et al. |
| 10,344,674 | B2 | 7/2019 | Cerny et al. |
| 10,364,750 | B2 | 7/2019 | Rambo |
| 10,443,436 | B2 | 10/2019 | Miller et al. |
| 10,458,715 | B2 | 10/2019 | Diffey |
| 10,487,739 | B2 | 11/2019 | Miller et al. |
| 10,507,934 | B1 | 12/2019 | Dyson, Jr. |
| 10,508,598 | B2 | 12/2019 | Weiner |
| 10,544,737 | B2 | 1/2020 | Bowden et al. |
| 10,550,767 | B2 | 2/2020 | Eleftheriou et al. |
| 10,598,094 | B2 | 3/2020 | Ekanayake et al. |
| 10,644,630 | B2 | 5/2020 | Smith et al. |
| 10,654,579 | B2 | 5/2020 | Diaz |
| 10,677,165 | B2 | 6/2020 | Roche |
| 10,677,166 | B2 | 6/2020 | Pesyna et al. |
| 10,787,996 | B2 | 9/2020 | Kupratis et al. |
| 10,975,769 | B2 | 4/2021 | Segura Martinez De Ilarduya et al. |
| 11,002,491 | B2 | 5/2021 | Pollard et al. |
| 11,125,161 | B2 | 9/2021 | Weiner |
| 11,125,511 | B2 | 9/2021 | Thomas et al. |
| 11,236,672 | B2 | 2/2022 | Roberge |
| 11,262,144 | B2 | 3/2022 | Breeze-Stringfellow et al. |
| 11,378,009 | B2 | 7/2022 | Roberge |
| 11,549,393 | B2 | 1/2023 | Cleyet et al. |
| 11,650,018 | B2 | 5/2023 | Roberge |
| 11,686,249 | B2 | 6/2023 | Pikovsky et al. |
| 2004/0197187 | A1 | 10/2004 | Usab et al. |
| 2004/0234372 | A1 | 11/2004 | Shahpar |
| 2005/0109012 | A1 | 5/2005 | Johnson |
| 2005/0241292 | A1 | 11/2005 | Taylor et al. |
| 2006/0186261 | A1 | 8/2006 | Unziker |
| 2007/0186535 | A1 | 8/2007 | Powell et al. |
| 2007/0251212 | A1 | 11/2007 | Tester |
| 2007/0261400 | A1 * | 11/2007 | Digele ................ F02B 29/0475 60/320 |
| 2008/0053100 | A1 | 3/2008 | Venkataramani et al. |
| 2009/0078819 | A1 | 3/2009 | Guering et al. |
| 2009/0090096 | A1 | 4/2009 | Sheridan |
| 2010/0014977 | A1 | 1/2010 | Shattuck |
| 2010/0111674 | A1 | 5/2010 | Sparks |
| 2010/0251726 | A1 | 10/2010 | Jones et al. |
| 2010/0326050 | A1 | 12/2010 | Schilling et al. |
| 2010/0329856 | A1 | 12/2010 | Hofer et al. |
| 2011/0150659 | A1 | 6/2011 | Micheli et al. |
| 2011/0192166 | A1 | 8/2011 | Mulcaire |
| 2012/0177493 | A1 | 7/2012 | Fabre |
| 2012/0315141 | A1 | 12/2012 | Udall |
| 2013/0098050 | A1 | 4/2013 | Kupratis |
| 2013/0104521 | A1 | 5/2013 | Kupratis |
| 2013/0104522 | A1 | 5/2013 | Kupratis |
| 2013/0104560 | A1 | 5/2013 | Kupratis |
| 2014/0044525 | A1 | 2/2014 | Storage et al. |
| 2014/0133982 | A1 | 5/2014 | Dejeu et al. |
| 2014/0345253 | A1 | 11/2014 | Dawson et al. |
| 2014/0345254 | A1 | 11/2014 | Dawson et al. |
| 2014/0363276 | A1 | 12/2014 | Vetters et al. |
| 2015/0003993 | A1 | 1/2015 | Kim et al. |

(56) References Cited

U.S. PATENT DOCUMENTS

| | | | |
|---|---|---|---|
| 2015/0098813 | A1 | 4/2015 | Jarrett, Jr. |
| 2015/0121893 | A1 | 5/2015 | Kupratis |
| 2015/0284070 | A1 | 10/2015 | Breeze-Stringfellow et al. |
| 2015/0291276 | A1 | 10/2015 | Zatorski et al. |
| 2016/0010487 | A1 | 1/2016 | Breeze-Stringfellow et al. |
| 2016/0017810 | A1 | 1/2016 | Lord et al. |
| 2016/0053692 | A1 | 2/2016 | Izquierdo |
| 2016/0090863 | A1 | 3/2016 | Diaz et al. |
| 2016/0160647 | A1 | 6/2016 | Hofer et al. |
| 2016/0201989 | A1 | 7/2016 | Martinez et al. |
| 2016/0230658 | A1 | 8/2016 | Hanlon et al. |
| 2016/0298550 | A1 | 10/2016 | Kupratis et al. |
| 2016/0333729 | A1 | 11/2016 | Miller et al. |
| 2016/0333734 | A1 | 11/2016 | Bowden et al. |
| 2016/0347463 | A1 | 12/2016 | Negulescu |
| 2017/0002230 | A1 | 1/2017 | Nowak et al. |
| 2017/0051678 | A1 | 2/2017 | Becker, Jr. |
| 2017/0051680 | A1 | 2/2017 | Becker, Jr. et al. |
| 2017/0102006 | A1 | 4/2017 | Miller et al. |
| 2017/0114721 | A1 | 4/2017 | Miller et al. |
| 2017/0167382 | A1 | 6/2017 | Miller et al. |
| 2017/0184027 | A1 | 6/2017 | Moniz et al. |
| 2017/0198719 | A1 | 7/2017 | Cerny et al. |
| 2017/0298763 | A1 | 10/2017 | Olver |
| 2018/0065727 | A1 | 3/2018 | Gruber et al. |
| 2018/0118364 | A1 | 5/2018 | Golshany et al. |
| 2018/0215475 | A1 | 8/2018 | Hurt et al. |
| 2018/0283795 | A1 | 10/2018 | Cerny et al. |
| 2019/0136710 | A1 | 5/2019 | Breeze-Stringfellow et al. |
| 2019/0153952 | A1 | 5/2019 | Niergarth et al. |
| 2019/0153953 | A1 | 5/2019 | Niergarth et al. |
| 2019/0204010 | A1 | 7/2019 | Breeze-Stringfellow et al. |
| 2019/0218971 | A1 | 7/2019 | Niergarth et al. |
| 2019/0249599 | A1 | 8/2019 | Sen et al. |
| 2019/0257247 | A1 | 8/2019 | Pal et al. |
| 2019/0271267 | A1 | 9/2019 | Husband et al. |
| 2019/0360401 | A1 | 11/2019 | Rambo et al. |
| 2020/0025109 | A1 | 1/2020 | Stieger et al. |
| 2020/0095939 | A1 | 3/2020 | Epstein |
| 2020/0116104 | A1 | 4/2020 | Levisse et al. |
| 2020/0122843 | A1 | 4/2020 | Porte et al. |
| 2020/0332717 | A1 | 10/2020 | Rambo |
| 2020/0332718 | A1 | 10/2020 | Rambo |
| 2020/0362759 | A1 | 11/2020 | Roberge |
| 2021/0108573 | A1 | 4/2021 | Sibbach et al. |
| 2021/0108595 | A1 | 4/2021 | Khalid et al. |
| 2021/0108597 | A1 | 4/2021 | Ostdiek et al. |
| 2021/0194326 | A1 * | 6/2021 | Lateb .................... F28D 1/0246 |
| 2022/0056811 | A1 | 2/2022 | Molesini et al. |
| 2022/0074678 | A1 | 3/2022 | Thomas et al. |
| 2022/0282670 | A1 | 9/2022 | Niergarth et al. |
| 2023/0184492 | A1 * | 6/2023 | Horoszczak .......... F28D 9/0062 165/166 |
| 2024/0417099 | A1 * | 12/2024 | Maalouf ................... F02C 3/22 |

FOREIGN PATENT DOCUMENTS

| | | | |
|---|---|---|---|
| DE | 1081277 | B | 5/1960 |
| DE | 102009058104 | A1 | 6/2011 |
| EP | 1988274 | A2 | 11/2008 |
| JP | H0370698 | A | 3/1991 |
| JP | 2006/123880 | A | 5/2006 |
| JP | 2011/069523 | A | 4/2011 |
| WO | WO2011/020458 | A2 | 2/2011 |

OTHER PUBLICATIONS

Naveen et al., CFD Analysis of Low Pressure Turbine Blade Using Vortex Generator Jets, Proceedings of $7^{th}$ International Conference on Intelligent Systems and Control (ISCO 2013) IEEE Explore, Coimbatore, Tamil Nadu, India, Jan. 4-5, 2013, pp. 541-544. https://ieeexplore.ieee.org/document/6481213.

Smith Jr, Unducted Fan Aerodynamic Design, Journal of Turbomachinery, vol. 109, Jul. 1987, pp. 313-324.

Theodorsen, Theory of Propellers, Wartime Report, NACA (National Advisory Committee for Aeronautics), Aug. 1944, pp. 1-53.

Wikipedia, Vortex Tube, 8 pages. Retrieved Aug. 1, 2024 from https://en.wikipedia.org/wiki/Vortex_tube.

Yamamoto et al., Numerical Calculation of Propfan/Swirl Recovery Vane Flow Field, AIAA-92-3771, AIAA//SAE/ASME/ASEE 28th Joint Propulsion Conference and Exhibit, Jul. 6-8, 1992, Nashville TN, pp. 1-9.

* cited by examiner

HEAT EXCHANGER ASSEMBLY WITH A BYPASS STRUCTURE

FIELD

The present disclosure relates to a heat exchanger assembly for a gas turbine engine.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited, generating hot combustion gases. The combustion gases are channeled to the turbines which extracts energy from the combustion gases for powering the compressors, as well as for producing useful work to propel an aircraft in flight. The turbomachine is mechanically coupled to the fan for driving the fan during operation.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
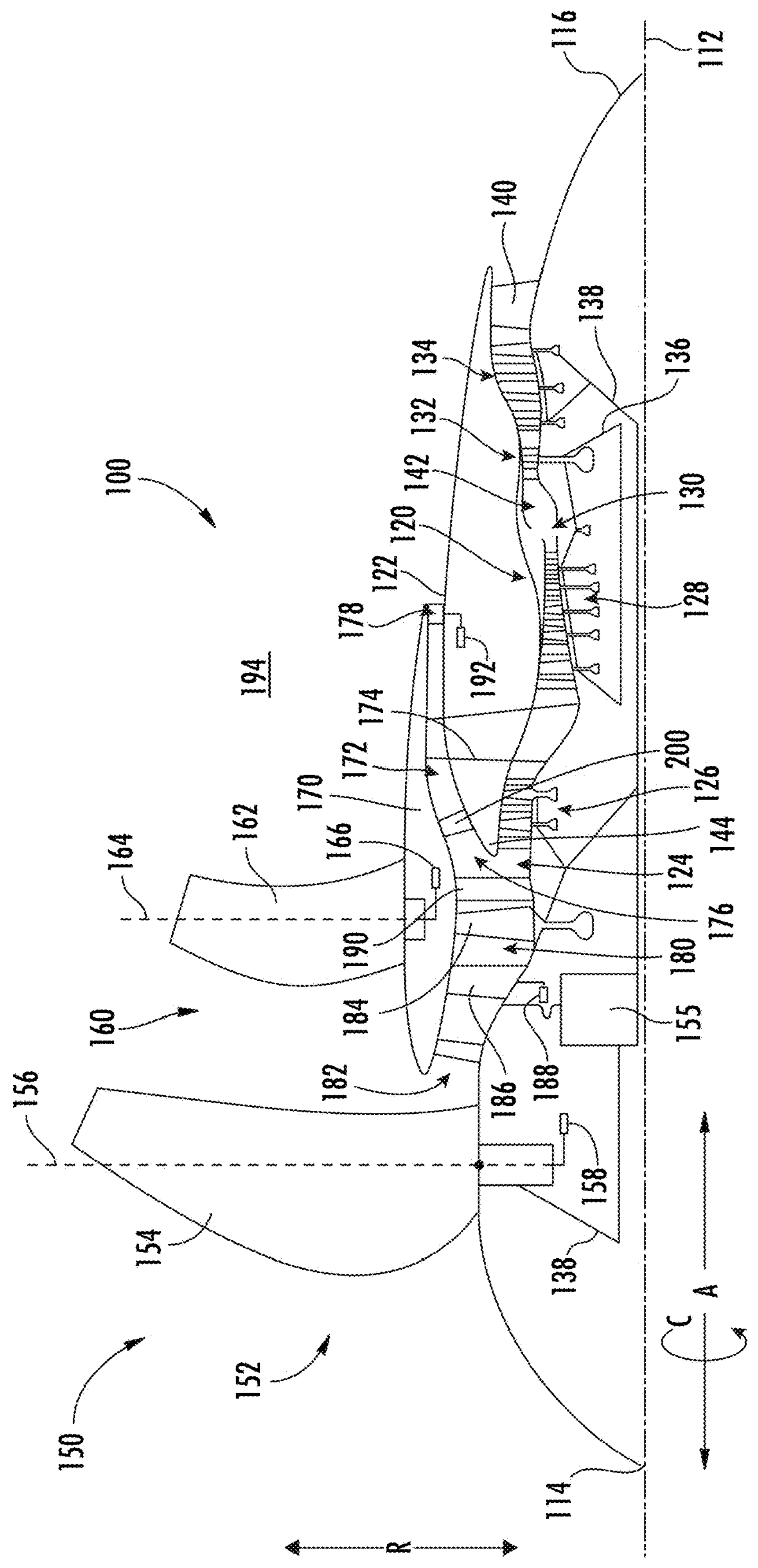
FIG. 1 is a schematic view of an exemplary gas turbine engine according to the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

As used herein, the terms "first," "second," "third," and other ordinals are used to distinguish one component from another and are not intended to signify location or importance of the individual components.

Aviation engines use fluids, such as oil or fuel, to dissipate heat from engine components, such as engine bearings, electrical generators, and the like. Heat is typically rejected from the fluid to air by heat exchanger assemblies, such as fuel cooled oil cooler or air cooled surface oil coolers, to maintain oil temperatures at $100° F. < T < 300° F$. In many instances an environment in which the engine may be operated may be as low as −65° F. When the engine is in an engine shut down occurrence in a low temperature environment, the oil within the heat exchanger assembly begins to cool and may become viscous, e.g., the oil congeals. As a result, due to the high viscosity of the oil, it does not flow through the heat exchanger assembly and uses a lengthy period of time to heat up the oil to a specified viscosity for flowing through the heat exchanger assembly. Heating the oil to a specified viscosity is also referred to as "decongealing" the oil, e.g., reversing the congealing of the oil and returning the oil to a more fluid state.

To decongeal the oil, the heat exchanger of the present disclosure includes a bypass channel with a flow controller that allows heated oil to flow through specific parts of the heat exchanger assembly. The bypass channel may define a larger diameter than the oil passages through the plates of the heat exchanger, allowing higher viscosity oil to flow more easily therethrough and reduce or inhibit oil shortage of downstream components or oil pumping system pressure exceedances. More specifically, the bypass channel connects an inlet manifold and an outlet manifold of the heat exchanger assembly, allowing heated oil to flow therethrough. A flow controller, such as a pressure-relief valve, an orifice, or a fixed-volume release, controls flow of the heated oil through the bypass channel.

To provide the heated oil from the bypass channel to the plates, the heat exchanger includes fins with fin channels that provide passage for the heated oil. The fin channels fluidly connect to plate channels in the plates, which define a heated fluid path from the bypass channel through the plates to the outlet manifold or back to the bypass channel. The flowing of heated oil heats other parts of the heat exchanger assembly, such as cross-flow plates that contain congealed oil. The heating of the heat exchanger assembly decongeals the oil, returning the heat exchanger assembly to nominal operation.

Referring now to FIG. 1, a schematic cross-sectional view of a gas turbine engine 100 is provided according to an example embodiment of the present disclosure. Particularly, FIG. 1 provides a turbofan engine having a rotor assembly with a single stage of unducted rotor blades. In such a manner, the rotor assembly may be referred to herein as an "unducted fan," or the entire gas turbine engine 100 may be referred to as an "unducted turbofan engine." In addition, the gas turbine engine 100 of FIG. 1 includes a third stream extending from the compressor section to a rotor assembly flowpath over the turbomachine, as will be explained in more detail below.

For reference, the gas turbine engine 100 defines an axial direction A, a radial direction R, and a circumferential direction C. Moreover, the gas turbine engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The gas turbine engine 100 extends between a forward end 114 and an aft end 116, e.g., along the axial direction A.

The gas turbine engine 100 includes a turbomachine 120 and a rotor assembly, also referred to a fan section 150, positioned upstream thereof. Generally, the turbomachine 120 includes, arranged in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the gas turbine engine 100 may be referred to as an open rotor engine.

As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween. Each fan blade 154 defines a central blade axis 156. For this embodiment, each fan blade 154 of the fan 152 is rotatable about its central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to the fan cowl 170.

As shown in FIG. 1, in addition to the fan 152, which is unducted, a ducted fan 184 is included aft of the fan 152, such that the gas turbine engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the low pressure turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the gas turbine engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The gas turbine engine 100 also defines or includes an inlet duct 180. The inlet duct 180 extends between the engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122. In the embodiment depicted, the inlet duct 180 is wider than the core duct 142 along the radial direction R. The inlet duct 180 is also wider than the fan duct 172 along the radial direction R.

Notably, for the embodiment depicted, the gas turbine engine 100 includes one or more features to increase an efficiency of a third stream thrust, Fnss (e.g., a thrust generated by an airflow through the fan duct 172 exiting through the fan exhaust nozzle 178, generated at least in part by the ducted fan 184). In particular, the gas turbine engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the gas turbine engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the gas turbine engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third stream thrust during one or more engine operating conditions. Further, by introducing a variability in the geometry of the inlet guide vanes 186 and the fan exhaust nozzle 178, the gas turbine engine 100 may be capable of generating more efficient third stream thrust across a relatively wide array of engine operating conditions, including takeoff and climb (where a maximum total engine thrust is generally needed) as well as cruise (where a lesser amount of total engine thrust is generally needed).

Moreover, referring still to FIG. 1, in exemplary embodiments, air passing through the fan duct 172 may be relatively cooler (e.g., lower temperature) than one or more fluids utilized in the turbomachine 120. In this way, one or more heat exchanger assemblies 200 may be positioned in thermal communication with the fan duct 172. For example, one or more heat exchanger assemblies 200 may be disposed within the fan duct 172 and utilized to cool one or more fluids from the core engine with the air passing through the fan duct 172, as a resource for removing heat from a fluid, e.g., compressor bleed air, oil or fuel.

Although not depicted, the heat exchanger assembly 200 may be an annular heat exchanger extending substantially 360 degrees in the fan duct 172 (e.g., at least 300 degrees, such as at least 330 degrees). In such a manner, the heat exchanger assembly 200 may effectively utilize the air passing through the fan duct 172 to cool one or more systems of the gas turbine engine 100 (e.g., lubrication oil systems, compressor bleed air, electrical components, etc.). The heat exchanger assembly 200 uses the air passing through the fan duct 172 as a heat sink and correspondingly increases the temperature of the air downstream of the heat exchanger assembly 200 and exiting the fan exhaust nozzle 178.

Figure 2:
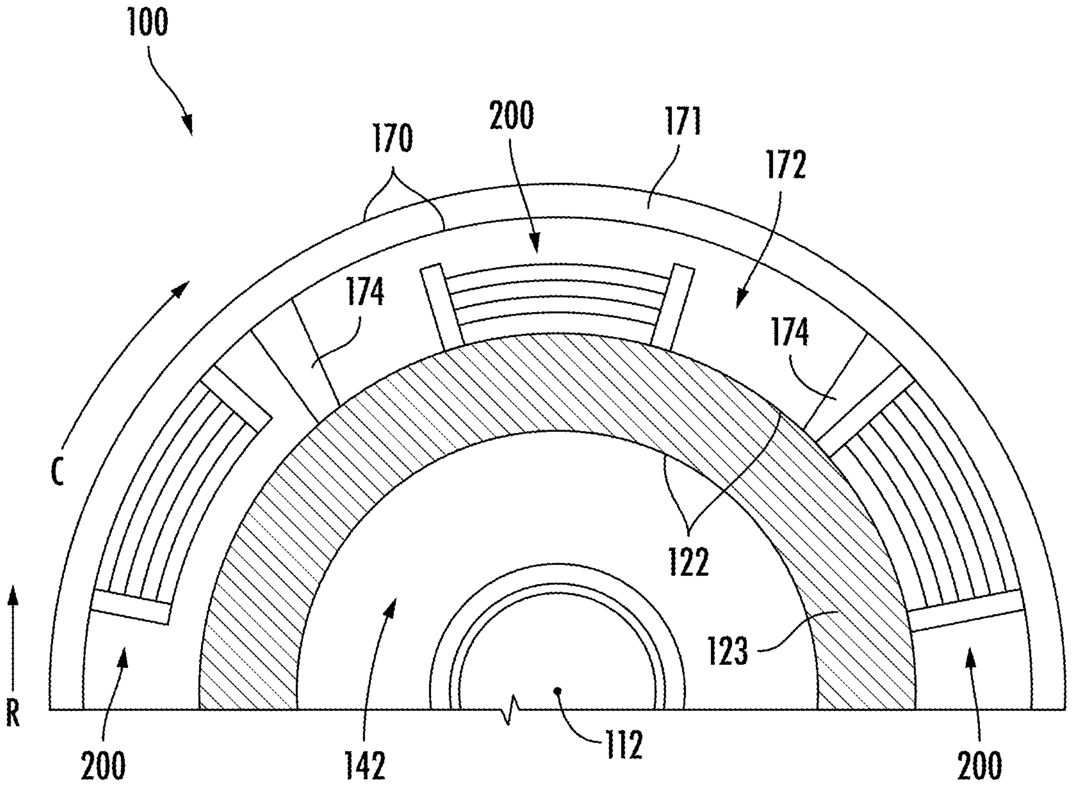
FIG. 2 is an aft-facing schematic view of the gas turbine engine including a heat exchanger assembly.

Referring now to FIG. 2, a cross-sectional view of the gas turbine engine 100 is shown with one or more heat exchanger assemblies 200 supported therein. The heat exchanger assemblies 200 are circumferentially arranged within the fan duct 172 and circumferentially spaced from each other. The heat exchanger assemblies 200 may be coupled to the gas turbine engine 100 in a variety of ways. As an example, as shown, the heat exchanger assemblies 200 may be coupled to the fan cowl 170 (e.g. coupled to the fan cowl 170 in some embodiments), such that the heat exchanger assembly 200 is secured within the fan duct 172 by the fan cowl 170. In many embodiments, the heat exchanger assembly 200 may extend at least partially through the fan cowl 170 and coupled directly to the supporting structure 171 (e.g. only to the supporting structure 171 in some embodiments), which is housed within the fan cowl 170, such that the heat exchanger assembly 200 is secured within the fan duct 172 by the supporting structure 171.

In other embodiments, the heat exchanger assembly 200 may be coupled to the core cowl 122 (e.g. coupled only to the core cowl 122 in some embodiments), such that the heat exchanger assembly 200 is secured to within the fan duct 172 by the core cowl 122. In many embodiments, the heat exchanger assembly 200 may extend at least partially through the core cowl 122 and couple directly to the supporting structure 123 (e.g. only to the supporting structure 123 in some embodiments), which is housed within the core cowl 122, such that the heat exchanger assembly 200 is secured within the fan duct 172 by the supporting structure 123.

In yet still further embodiments, the heat exchanger assembly 200 may be coupled to one or more of the stationary struts 174 (e.g. only to the stationary strut(s) 174 in some embodiments), such that the heat exchanger assembly 200 may be secured within the fan duct by the stationary strut(s) 174. In yet still further embodiments, one or more of the heat exchanger assemblies 200 may be coupled to any combination of the fan duct 172, the supporting structure 171, the core cowl 122, the supporting structure 123, and the one or more stationary struts 174.

In particular embodiments, as described above, each of the heat exchanger assemblies 200 may be coupled to a different structure within the fan duct 172 of the gas turbine engine 100. For example, as shown, a first heat exchanger assembly 200 may be coupled to the fan cowl 170 (and/or to the supporting structure 171), a second heat exchanger assembly 200 may be coupled to the core cowl 122 (and/or to the supporting structure 123), and a third heat exchanger assembly 200 may be coupled to the stationary strut 174.

Figure 3:
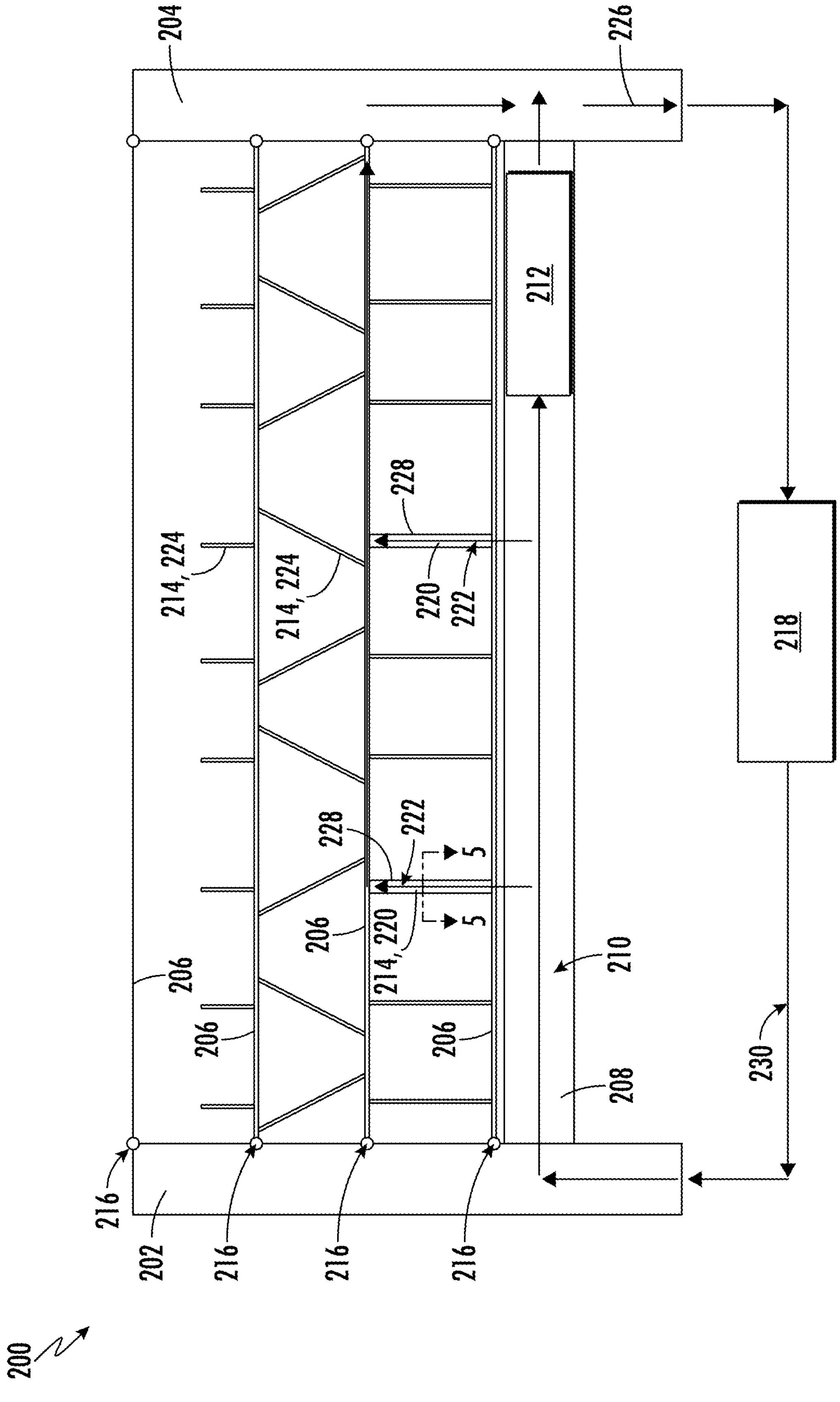
FIG. 3 is an aft-facing schematic view of the heat exchanger assembly.
Figure 4:
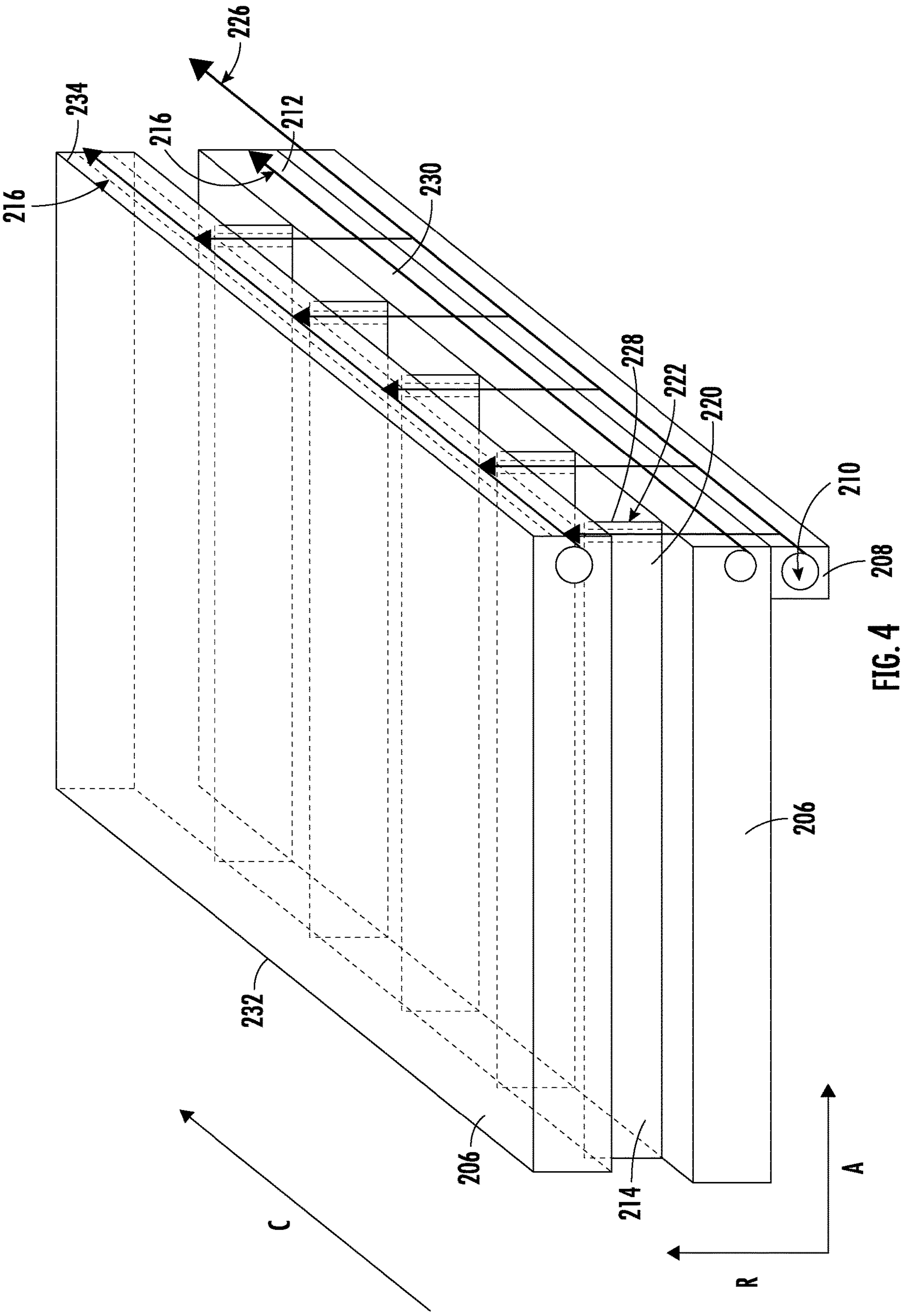
FIG. 4 is a perspective schematic view of the heat exchanger assembly of FIG. 3.

Now referring to FIGS. 3-4, schematic views of one of the heat exchanger assemblies 200 are provided. FIG. 3 is an aft-facing view of the heat exchanger assembly 200. FIG. 4 is a perspective view of the heat exchanger assembly.

The heat exchanger assembly 200 includes an inlet manifold 202, an outlet manifold 204, a plurality of plates 206 extending from the inlet manifold 202 to the outlet manifold 204, a bypass structure 208 defining a bypass channel 210, a flow controller 212 in fluid communication with the bypass channel 210, and a plurality of fins 214. The heat exchanger assembly 200 described herein may be substantially hollow, such that a plurality of individualized fluid circuits are defined within the heat exchanger assembly 200. The plurality of individualized fluid circuits allow for multiple different motive fluids (e.g. from various systems of an aircraft engine) to pass through the heat exchanger assembly 200 simultaneously and thermally communicate with one another and with the air passing through the gas turbine engine 100. For example, both the inlet and outlet manifolds 202, 204 and the plates 206 may include various fluid passages and channels defined therein to permit a working fluid (such as a coolant or other motive fluid) to travel therethrough during operation.

The inlet and outlet manifolds 202, 204 act as fluid routing manifolds, which route the fluid to and from plate channels 216 defined in the plates 206. The inlet manifold 202 may be shaped generally as a rectangular prism having a singular curved surface, such as a radially outward surface. Likewise, the outlet manifold 204 may be shaped generally as a rectangular prism having a singular curved surface, such as a radially outward surface. The curved surfaces may conform to the shape of the fan duct 172, the core cowl 122, the fan cowl 170, or any other curved structure to which the heat exchanger assembly 200 is attached.

The plurality of plates 206 are supported by the inlet manifold 202 and the outlet manifold 204. The plates 206 define plate channels 216 that allow the fluid to move from the inlet manifold 202 to the outlet manifold 204, transferring heat to and from air passing across exterior surfaces of the plates 206. When the fluid is congealed, the fluid may be too viscous to flow through the plate channels 216, and the fluid may accumulate in the inlet manifold 202. As will be described in further detail below, when the plates 206 are heated, the fluid in the plate channels 216 loosens, decreasing its viscosity and resuming flow to the outlet manifold 204. It will be appreciated that, while the plates 206 of FIG. 3 are shown as flat, the plates 206 may be curved to align with the curved core cowl 122 as shown in FIG. 2.

The bypass structure 208 defining the bypass channel 210 is disposed adjacent to one of the plurality of plates 206. The bypass structure 208 may conform to parts of the fan duct 172 to improve the connection of the heat exchanger assembly 200 to the fan duct 172 and may improve the aerodynamic performance of the heat exchanger assembly. The bypass structure 208 may include a securing feature, such as a hook or a flange, that mates with a portion of the fan duct 172 to further secure the heat exchanger assembly 200. The bypass structure 208 may be arranged adjacent to one of the plurality of plates 206, such as a bottommost one of the plurality of plates 206. In one form, the bypass structure 208 is a flat member, such as a plate similar to one of the plurality of plates 206. Alternatively, the bypass structure 208 may have a different shape, such as a tube. Yet alternatively, the bypass structure 208 is curved, similar to when the plurality of plates 206 are curved to align with the core cowl 122 (FIG. 2).

The bypass channel 210 extends from the inlet manifold 202 to the outlet manifold 204 to allow the fluid to move from the inlet manifold 202 to the outlet manifold 204 without flowing through the plurality of plates 206, i.e., "bypassing" the plates 206. By bypassing the plates 206, the bypass channel 210 allows the fluid to heat the inlet manifold 202 and the outlet manifold 204, decongealing the fluid disposed in the plurality of plates 206.

To provide the heat source to decongeal the fluid in the plates 206, the flow controller 212 fluidly connects a heated fluid supply 218 to the bypass channel 210. In this context, a "flow controller" is a structure or device that controls the flow of the fluid from the heated fluid supply to the bypass channel 210. The flow controller 212 may be a one-way valve, such as a pressure-relief valve, that allows fluid to flow through the bypass channel 210, heating the inlet manifold 202 and the outlet manifold. The flow controller 212 may be actuated in any suitable way, such as a thermal actuation, a servo, a pressure actuation, or combinations thereof.

The heated fluid supply 218 provides a heated fluid 230 to the bypass structure 208, and the bypass channel 210 provides the heated fluid 230 to the inlet manifold 202, the outlet manifold 204, the plate 206, and the fins 214. Heat from the heated fluid 230 flowing through the bypass channel 210 heats the bypass structure 208. The heat conducted through the plate channels 216 heats the congealed fluid disposed therein, decongealing the plurality of plates 206.

The plurality of fins 214 extend from the bypass structure 208 to the plurality of plates 206 or extend between adjacent ones of the plurality of plates 206. The plurality of fins 214 include fluid fins 220 that define at least one fin channel 222 and cooling fins 224 that lack the fin channel 222. The fins 214 generally transfer heat from the plates 206 to air flowing through the heat exchanger assembly 200.

The fluid fins 220 use the fin channel 222 to transmit the heated fluid 230 from the bypass channel 210 to one of the plate channels 216 of one of the plates 206. The cooling fins 224 are solid structures that lack fin channels 222 or other channels or voids that transfer fluid. The cooling fins 224 solely provide heat transfer from the plates 206 to air flowing through the heat exchanger assembly 200, cooling the plates 206. In this context, "fins" 214 refer collectively to both fluid fins 220 with fin channels 222 and cooling fins 224 without fin channels 222.

FIG. 3 shows two fluid fins 220 defining respective fin channels 222 that transmit the heated fluid 230 to one of the plate channels 216. In such a form, the bypass channel 210, the fin channels 222, and the plate channel 216 define a fluid path 226 for the heated fluid 230 from the heated fluid supply 218 to the outlet manifold 204, shown in FIG. 3 additionally with arrows. The fins 214 may include a thermal barrier coating (TBC) 228 disposed on respective outer surfaces of the fins 214. The TBC 228 insulates the fins 214, reducing heat loss from the heated fluid 230.

During operation, the heated fluid 230 typically flows into the inlet manifold 202, through the plurality of plates 206, and out through the outlet manifold 204. When the fluid congeals or reaches an exceedingly-high viscosity in the plurality of plates 206, the pressure drop increases across the manifolds 202, 204 and the plates 206. When the fluid reaches a specified fluid differential pressure, the flow controller 212 opens, allowing the heated fluid 230 to flow through the bypass channel 210 and into the fins 214. The heated fluid 230 flows through the fin channels of the fins and into the plate channels of at least one of the plurality of plates 206, heating the plates 206. As the temperature of the plates 206 increases from the heating, the congealed fluid in the plates 206 is also heated. The heating of the congealed fluid lowers the viscosity of the fluid, which allows the fluid to flow through the plates 206 to the outlet manifold 204. Then, once the plates 206 have been decongealed, fluid from the inlet manifold 202 begins to flow through the plurality of plates 206 again, and the flow controller 212 closes the bypass channel 210, forcing the fluid into the inlet manifold 202 until the fluid in the plates 206 congeals again. It will be appreciated that the flow controller 212 may be positioned at any suitable position, such as at an inlet of the bypass structure 208, and outlet of the bypass structure 208, at an intermediate point on the bypass structure 208, or in another position that allows the flow controller 212 to control flow of the heated fluid 230.

Now referring to FIG. 4, a perspective view of the heat exchanger assembly 200 is provided. Specifically, FIG. 4 illustrates the bypass structure 208 with the bypass channel 210, one of the plates 206 with one plate channel 216, and a plurality of fluid fins 220 with fin channels 222.

The plate 206 extends from a leading edge 232 to a trailing edge 234. Air flowing through the heat exchanger assembly 200 flows from the leading edge 232 to the trailing edge 234 in the axial direction A. The fluid fins 220 extend in the axial direction A from the leading edge of the plate 206 to the trailing edge of the plate 206. The fin channels 222 extend in the radial direction R through their respective fins 214 to the plate channel 216. The bypass structure 208 is disposed at the trailing edge of the plate 206.

Figure 5C:
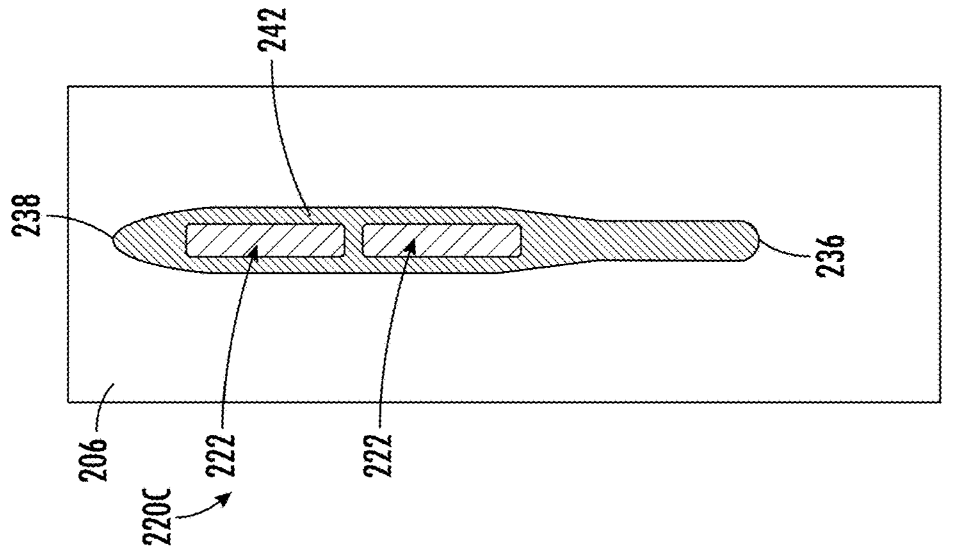
FIGS. 5A-5C are cross-sectional views of exemplary fins of the heat exchanger assembly of FIG. 3 along the line 5-5.
Figure 5B:
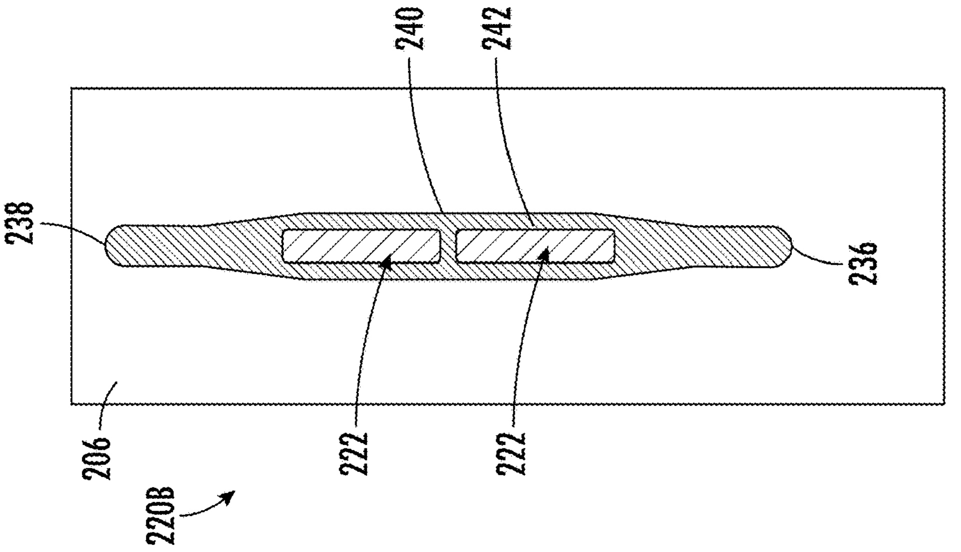
Figure 5A:
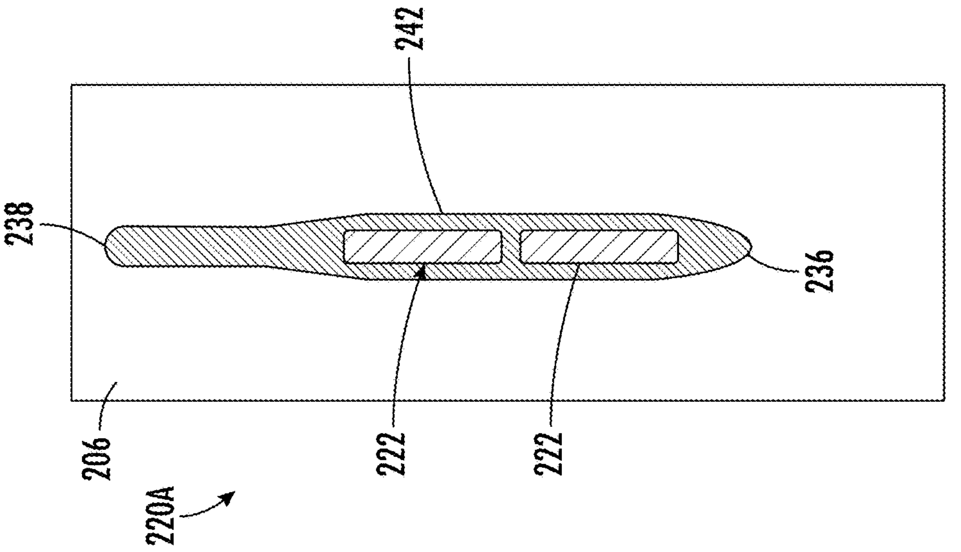

With reference to FIGS. 5A-5C, cross-sectional views of an exemplary one of the fluid fins 220 according to the perspective along the line 5-5 in FIG. 3 are provided. FIG. 5A shows fin channels 222 of a fluid fin 220A in a first arrangement. FIG. 5B shows the fin channels 222 of a fluid fin 220B in a second arrangement. FIG. 5C shows the fin channels 222 of a fluid fin 220C in a third arrangement.

Each of the fluid fins 220A, 220B, 220C includes a plurality of fin channels 222. The fin channels 222 may be defined at specific locations within the fin 220A, 220B, 220C. As shown in FIG. 5A, the fin channels 222 may be arranged closer to an aft end 236 of the fin 220A than a forward end 238 of the fin 220A. As shown in FIG. 5B, the fin channels 222 may be arranged in a middle portion 240 of the 220B, substantially evenly distanced from the forward end 238 and the aft end 236. As shown in FIG. 5C, the fin channels 222 may be arranged closer to the forward end 238 than the aft end 236. FIGS. 5A-5C show two fin channels 222, and it will be appreciated that the fin 214 may include a different number of fin channels 222, such as one, three, four, or another number.

Each of the fluid fins 220A, 220B, 220C has an enlarged portion 242 that defines an airfoil shape. The airfoil shape improves air flow past the fluid fins 220A, 220B, 220C during operation of the heat exchanger assembly, thereby improving heat transfer from the plate 206. The enlarged portion 242 is located at a suitable position in the fin 220A, 220B, 220C for fluid control. The fin 220A has the enlarged portion 242 at the aft end 236, the fin 220B has the enlarged portion 242 at the middle portion 240, and the fin 220C has the enlarged portion at the forward end 238.

Figure 6:
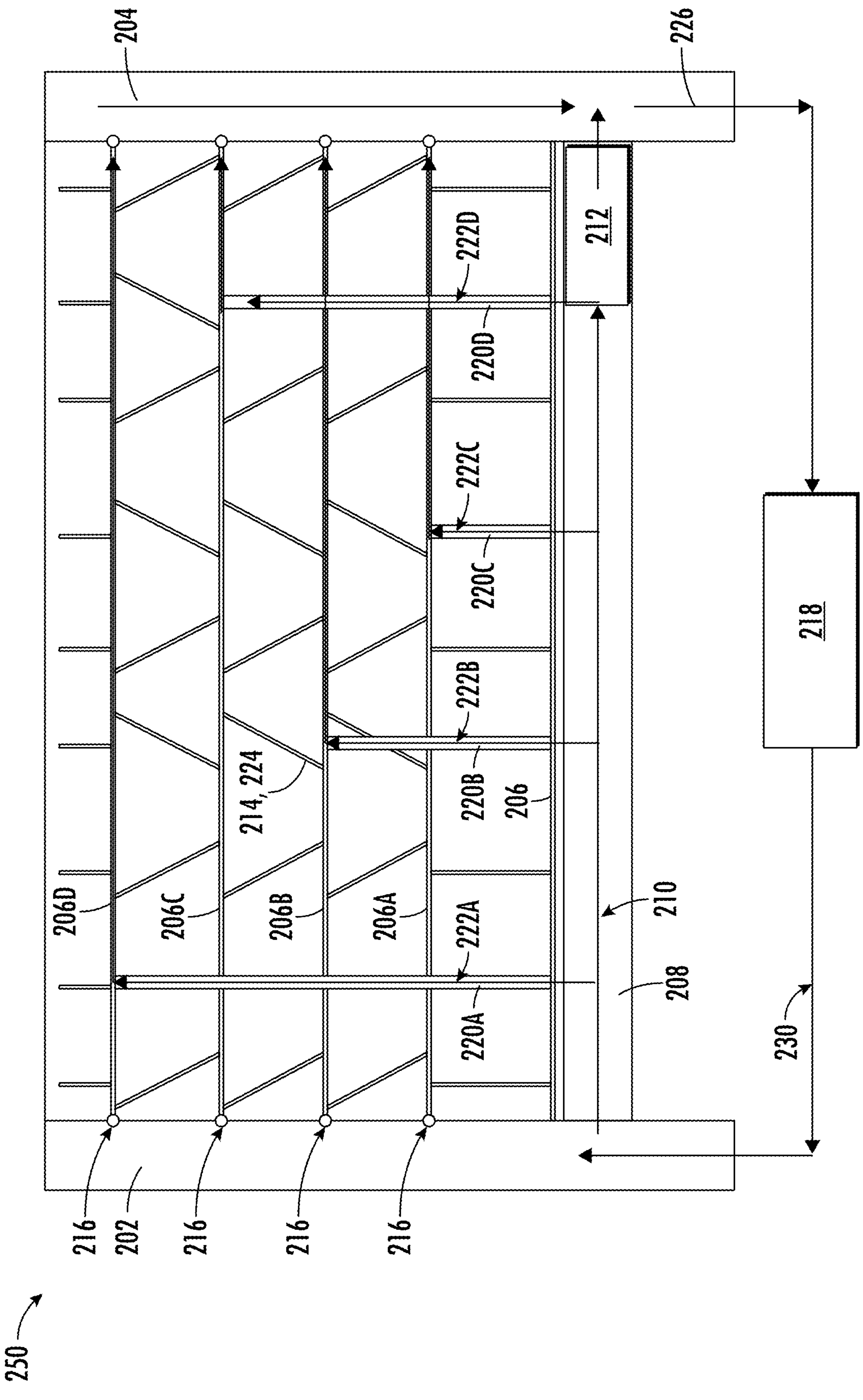
FIG. 6 is an aft-facing schematic view of another heat exchanger assembly.

Now referring to FIG. 6, a schematic view of another heat exchanger assembly 250 is provided. The heat exchanger assembly 250 includes a plurality of plates 206 extending between an inlet manifold 202 and an outlet manifold 204 and a bypass structure 208 defining a bypass channel 210. The plurality of plates 206 include a first plate 206A, a second plate 206B, a third plate 206C, and a fourth plate 206D.

The heat exchanger assembly 250 includes a plurality of fins 214 including a plurality of fluid fins 220 that extend from the bypass structure 208 to one of the plurality of plates 206 and a plurality of cooling fins 224 extending between plates 206. Specifically, in FIG. 6, the heat exchanger assembly 250 includes a first fluid fin 220A defining a first fin channel 222A and extending to the first plate 206A, a second fluid fin 220B defining a second fin channel 222B and extending to the third plate 206C, a third fluid fin 220C defining a third fin channel 222C and extending to the fourth plate 206D, and a fourth fluid fin 220D defining a fourth fin channel 222D extending to the second plate 206B. By extending the fluid fins 220 to different plates 206, the heated fluid path extends through each of the plates 206. As the heated fluid 230 flows from the bypass channel 210 through the plate channels 216 of each of the plates 206, the heated fluid 230 heats the plates 206, decongealing fluid in the plates 206.

Figure 7:
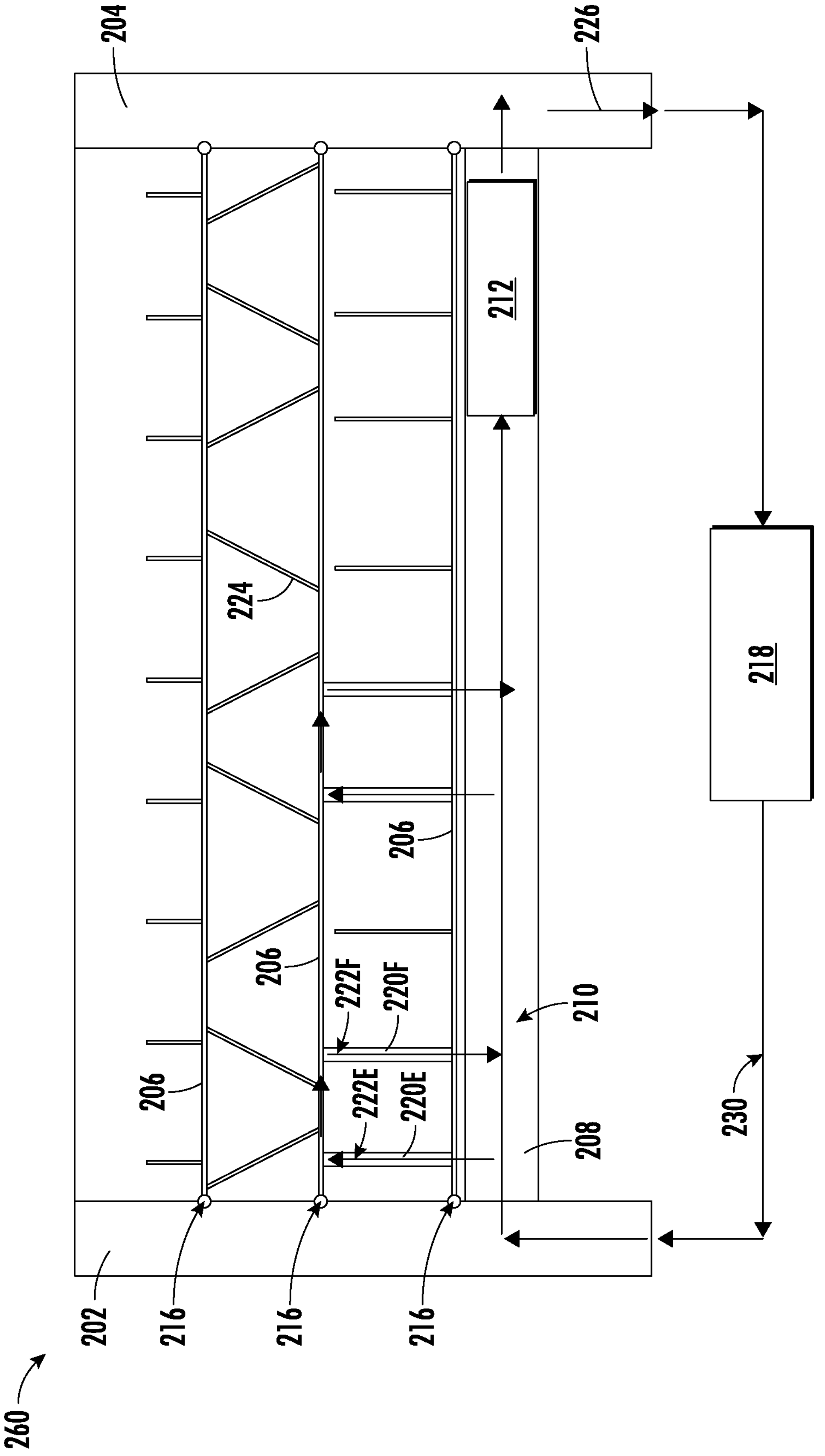
FIG. 7 is an aft-facing schematic view of another heat exchanger assembly.
Figure 8:
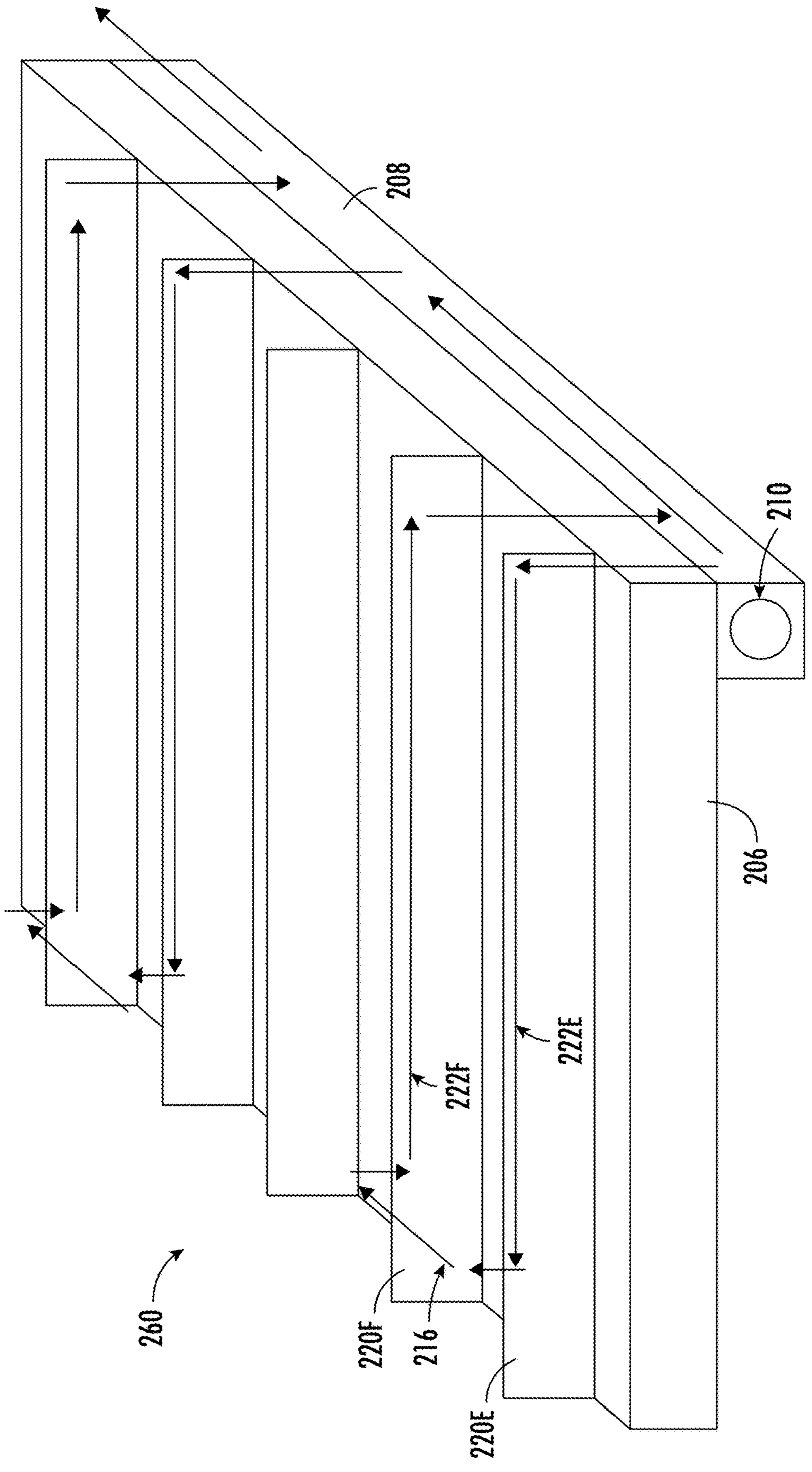
FIG. 8 is a perspective view of the heat exchanger assembly of FIG. 7.

With reference to FIGS. 7-8, a schematic view of another heat exchanger assembly 260 is provided. FIG. 7 is an aft-facing view of the heat exchanger assembly 260. FIG. 8 is a partial perspective view of the heat exchanger assembly 260.

The heat exchanger assembly 200 includes a plurality of plates 206 defining plate channels 216, a bypass structure 208 defining a bypass channel 210, and a plurality of fins 214 defining fin channels 222. The bypass channel 210, the fin channels 222, and the plate channels 216 define a heated fluid path for a heated fluid. The heated fluid path allows the heated fluid 230 to flow in the axial direction A along the fins 214, heating the plates 206. In particular, the heat exchanger assembly includes a first fluid fin 220E defining a first fin channel 222E and a second fluid fin 220F defining a second fin channel 222F. The first fin channel 222E and the second fin channel 222F are fluidly connected to each other by the plate channel 216, and the heated fluid 230 flows from the first fin channel 222E into the plate channel 216 and the into the second fin channel 222F. By flowing the heated fluid 230 along the fins 214 in the axial direction A in the fin channels 222, the heated fluid 230 heats additional regions of the plates 206, decongealing additional fluid in the plates 206.

Figure 9:
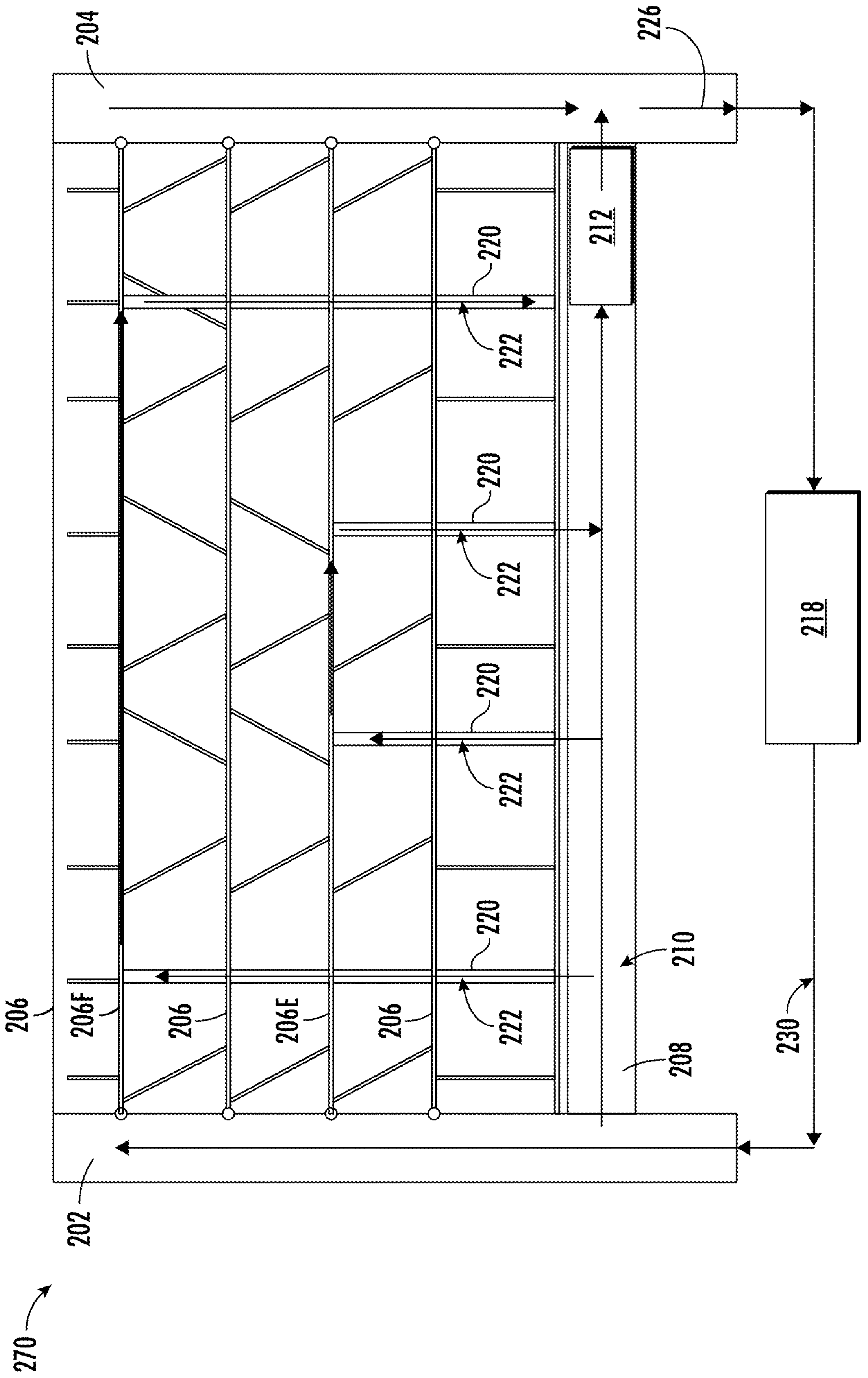
FIG. 9 is an aft-facing schematic view of another heat exchanger assembly.

Now referring to FIG. 9, a schematic view of another heat exchanger assembly 270 is provided. As with the heat exchanger assembly 260 of FIGS. 7-8, heated fluid 230 flows in the axial direction A in the fin channels 222 between a trailing edge 234 of the plate 206 and a leading edge 232 of the plate 206 (as shown in FIG. 4). In particular, two of the fluid fins 220 are connected to a first plate 206E, and two others of the fluid fins 220 are connected to a second plate 206F. The heated fluid path 226 thus extends between the plate channels 216 both of the plates 206E, 206F, decongealing the fluid therein. It will be appreciated that any pair of the fluid fins 220 may be fluidly connected to any one of the plates 206 to define the heated fluid path 226.

Figure 10:
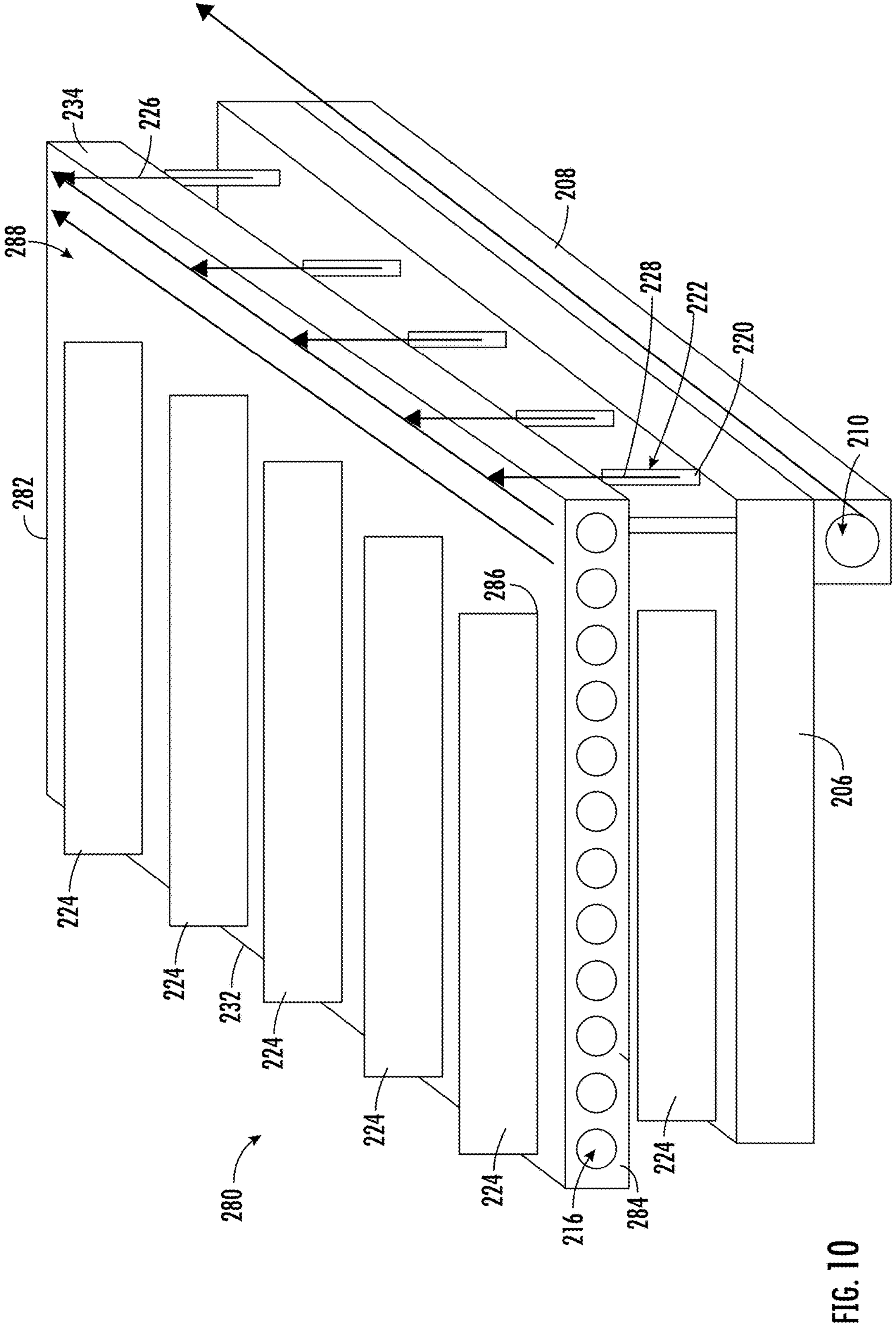
FIG. 10 is a perspective schematic view of another heat exchanger assembly.

Now referring to FIG. 10, a perspective view of another heat exchanger assembly 280 is provided. The heat exchanger assembly 280 includes a plate 206 defining an outer surface 282, an inner surface 284, and a plurality of plate channels 216, a bypass structure 208 defining a bypass channel 210, a plurality of fluid fins 220 extending from the bypass structure 208 to the inner surface 284 of the plate 206, and a plurality of cooling fins 224 disposed on the outer surface 282 of the plate 206 and on the inner surface of the plate 206. The plate 206 further defines a leading edge 232 and a trailing edge 234. It will be appreciated that the terms “outer” and “inner” in this context are relative to the orientation of FIG. 10.

The fluid fins 220 define respective fin channels 222 that fluidly connect the bypass channel 210 to at least one of the plate channels 216. Each of the fluid fins 220 may include a TBC 228 that reduces or inhibits heat loss from the heated fluid 230. In such a form, the fluid fins 220 form a heated fluid path 226 to decongeal fluid in the plate channels 216.

Each of the cooling fins 224 extends from the leading edge 232 of the plate to a termination point 286 that spaced from the trailing edge 234 of the plate 206. In such a form, the cooling fins 224 extend partially from the leading edge 232 toward the trailing edge 234, defining a “heating zone” 288 that is a region of the plate 206 in which no cooling fins 224 are disposed. In particular, the heating zone 288 includes the plate channels 216 that are connected to the fluid fins 220, such that the heated fluid 230 flows through the plate 206 in the heating zone 288. Because there are no cooling fins 224 in the heating zone 288, the heat from the heated fluid 230 is transferred through the plate 206 to adjacent plate channels 216, decongealing the coolant therein.

Figure 11:
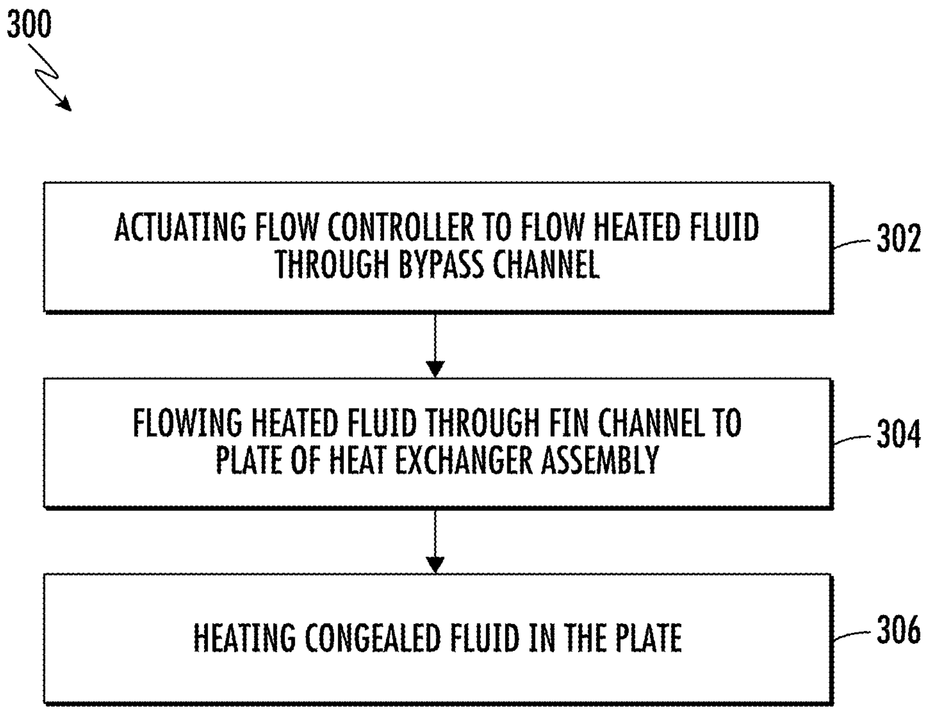
FIG. 11 is a block diagram of an exemplary method for decongealing a heat exchanger assembly.

Referring now to FIG. 11, a flow diagram of a method 300 of decongealing a heat exchanger assembly in accordance with an exemplary aspect of the present disclosure is provided. As is depicted, the method 300 includes at (302) actuating a flow controller to flow a heated fluid through a bypass channel of a heat exchanger assembly. As described above, the bypass channel is fluidly connected to a heated fluid supply that, and the flow controller provides heated fluid from the heated fluid supply to the bypass channel. The bypass channel is disposed adjacent to one of a plurality of plates of the heat exchanger assembly.

The method 300 includes at (304) flowing the heated fluid from the bypass channel through a fin channel of a fin connected to a plate of the heat exchanger assembly. In particular, the fin channel fluidly connects the bypass channel and a first plate channel of the plate to allow the heated fluid to flow therethrough. The first plate channel is adjacent to a second plate channel containing the congealed fluid. As described above, the bypass channel may be connected to a plurality of fins with respective fin channels that are connected to a plurality of plates. Additionally, the fin channel may extend in an axial direction A, and the heated fluid may flow in the axial direction A along the plate. The plate channel fluidly connects to an outlet manifold and/or back to the bypass channel, allowing the heated fluid to leave the heat exchanger assembly.

The method 300 includes at (306) heating the congealed fluid in the plate with the heated fluid from the fin channel. As described above, as the heated fluid flows through the first plate channel, the temperature of the plate increases, which increases the temperature of the congealed fluid in the second plate channel. The increased temperature of the congealed fluid decreases a viscosity of the congealed fluid, decongealing the fluid. As such, the decongealed fluid flows through the second plate channel to the outlet manifold, and the heat exchanger assembly returns to nominal operation.

By incorporating fin channels into fins of a heat exchanger, heated fluid from a bypass channel flows into plate channels of plates of the heat exchanger, transferring heat to the plates. The heat transferred from the plates decongeals oil in other plate channels, which allows oil to flow from an inlet manifold through the plates to an outlet manifold. Decongealing the oil in the heat exchanger in such a manner returns the heat exchanger to nominal operation, improving operation of a gas turbine engine.

Further aspects are provided by the subject matter of the following clauses:

A heat exchanger assembly includes an inlet manifold, an outlet manifold, a plate extending from the inlet manifold to the outlet manifold, the plate defining a plate channel, a bypass structure defining a bypass channel in fluid communication with the outlet manifold and with a heated fluid supply, and a fin extending between the bypass channel and the plate, the fin defining a fin channel fluidly connecting the bypass channel to the plate channel.

The heat exchanger assembly of any of the preceding clauses, further including a flow controller fluidly connecting the heated fluid supply to the bypass channel.

The heat exchanger assembly of any of the preceding clauses, further including a second fin downstream of the fin, the second fin defining a second fin channel fluidly connecting the plate channel to the bypass channel.

The heat exchanger assembly of any of the preceding clauses, wherein the fin channel is fluidly connected to the second fin channel.

The heat exchanger assembly of any of the preceding clauses, wherein the fin defines a plurality of fin channels, and the fin channel is one of the plurality of fin channels.

The heat exchanger assembly of any of the preceding clauses, wherein the plate defines a leading edge and a trailing edge, wherein the fin channel extends in an axial direction from the leading edge of the plate to the trailing edge of the plate.

The heat exchanger assembly of any of the preceding clauses, wherein the plate defines a leading edge and a trailing edge, wherein the fin extends from the bypass channel to the trailing edge of the plate.

The heat exchanger assembly of any of the preceding clauses, further including a second fin disposed on an outer surface of the plate, the second fin extending from the leading edge of the plate to a termination point spaced from the trailing edge of the plate.

The heat exchanger assembly of any of the preceding clauses, further including a thermal barrier coating disposed on the fin.

The heat exchanger assembly of any of the preceding clauses, further including a plurality of fins, and the fin is one of the plurality of fins.

The heat exchanger assembly of any of the preceding clauses, further including a plurality of plates, each of the plurality of plates extending from the inlet manifold to the outlet manifold, wherein each of the plurality of fins extends from the bypass channel to one of the plurality of plates.

The heat exchanger assembly of any of the preceding clauses, wherein the bypass channel, the fin channel, and the plate channel define a fluid path for a heated fluid from the heated fluid supply.

A method of decongealing a heat exchanger assembly, the method including actuating a flow controller to flow a heated fluid through a bypass channel of a heat exchanger assembly, wherein the bypass channel is adjacent to one of a plurality of plates of the heat exchanger assembly, flowing the heated fluid from the bypass channel through a fin channel of a fin connected to a plate of the heat exchanger assembly, and heating a congealed fluid in the plate with the heated fluid from the fin channel.

The method of any of the preceding clauses, further including flowing the heated fluid through a first plate channel adjacent to a second plate channel containing the congealed fluid.

The method of any of the preceding clauses, further including flowing the heated fluid through the fin channel in an axial direction along the plate of the heat exchanger assembly.

The method of any of the preceding clauses, further including flowing the heated fluid from the plate channel through a second fin channel of a second fin to the bypass channel.

The method of any of the preceding clauses, further including flowing the heated fluid from the bypass channel through a second fin channel of a second fin connected to a second plate of the heat exchanger assembly.

The method of any of the preceding clauses, further including flowing the heated fluid through a plate channel extending through the plate of the heat exchanger assembly to an outlet manifold.

The method of any of the preceding clauses, further including actuating the flow controller to provide the heated fluid from a heated fluid supply to the bypass channel.

A gas turbine engine includes a turbomachine including a compressor section, a combustion section, and a turbine section arranged in serial flow order, the turbomachine defining an engine inlet to an inlet duct, a fan duct inlet to a fan duct, and a core inlet to a core duct, a primary fan driven by the turbomachine, a heated fluid supply, and a heat exchanger assembly including an inlet manifold, an outlet manifold, a plate extending from the inlet manifold to the outlet manifold, the plate defining a plate channel, a bypass structure defining a bypass channel in fluid communication with the outlet manifold and with the heated fluid supply, and a fin extending between the bypass channel and the plate, the fin defining a fin channel fluidly connecting the bypass channel to the plate channel.

A heat exchanger assembly includes a manifold, a plate extending from the manifold, the plate defining a plate channel, and a fin extending from the plate, the fin defining a fin channel fluidly connecting the plate channel to a heated fluid supply.

A heat exchanger assembly includes an inlet manifold, an outlet manifold, a plate extending from the inlet manifold to the outlet manifold, the plate defining a plate channel, a bypass structure defining a bypass channel in fluid communication with the outlet manifold and with a heated fluid supply, a fin extending between the bypass channel and the plate, the fin defining a fin channel fluidly connecting the bypass channel to the plate channel, and a second fin disposed on an outer surface of the plate, the second fin extending from the leading edge of the plate to a termination point spaced from the trailing edge of the plate, wherein the plate defines a heating zone between the trailing edge of the plate and the termination point, wherein the plate channel extends from the inlet manifold to the outlet manifold in the heating zone.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heat exchanger assembly, comprising:

an inlet manifold;

an outlet manifold;

a bypass structure defining a bypass channel in fluid communication with the outlet manifold and with a heated fluid supply;

a first plate extending from the inlet manifold to the outlet manifold and disposed on the bypass structure, the first plate defining a first plate channel in fluid communication with the bypass channel;

a second plate extending from the inlet manifold to the outlet manifold, the second plate defining a second plate channel; and a fin extending between the first plate and the second plate, the fin defining a fin channel fluidly connecting the first plate channel to the second plate channel.

2. The heat exchanger assembly of claim 1, further comprising a flow controller fluidly connecting the heated fluid supply to the bypass channel.

3. The heat exchanger assembly of claim 1, further comprising a second fin downstream of the fin, the second fin defining a second fin channel fluidly connecting the first plate channel to the second plate channel.

4. The heat exchanger assembly of claim 3, wherein the fin channel is fluidly connected to the second fin channel.

5. The heat exchanger assembly of claim 1, wherein the fin defines a plurality of fin channels, and the fin channel is one of the plurality of fin channels.

6. The heat exchanger assembly of claim 1, wherein the first plate defines a leading edge and a trailing edge, wherein the fin channel extends in an axial direction from the leading edge of the first plate to the trailing edge of the first plate.

7. The heat exchanger assembly of claim 1, wherein the first plate defines a leading edge and a trailing edge, wherein the fin extends to the trailing edge of the first plate.

8. The heat exchanger assembly of claim 7, further comprising a second fin disposed on an outer surface of the first plate, the second fin extending from the leading edge of the first plate to a termination point spaced from the trailing edge of the first plate.

9. The heat exchanger assembly of claim 1, further comprising a thermal barrier coating disposed on the fin.

10. The heat exchanger assembly of claim 1, further comprising a plurality of fins, and the fin is one of the plurality of fins.

11. The heat exchanger assembly of claim 10, further comprising a plurality of plates including the first plate, each of the plurality of plates extending from the inlet manifold to the outlet manifold, wherein each of the plurality of fins extends between two of the plurality of plates.

12. The heat exchanger assembly of claim 1, wherein the bypass channel, the fin channel, the first plate channel, and the second plate channel define a fluid path for a heated fluid from the heated fluid supply.

13. A gas turbine engine, comprising:

a turbomachine comprising a compressor section, a combustion section, and a turbine section arranged in serial flow order, the turbomachine defining an engine inlet to an inlet duct, a fan duct inlet to a fan duct, and a core inlet to a core duct;

a primary fan driven by the turbomachine;

a heated fluid supply; and a heat exchanger assembly comprising:

an inlet manifold;

an outlet manifold;

a bypass structure defining a bypass channel in fluid communication with the outlet manifold and with the heated fluid supply;

a first plate extending from the inlet manifold to the outlet manifold and disposed on the bypass structure, the first plate defining a first plate channel in fluid communication with the bypass channel;

a second plate extending from the inlet manifold to the outlet manifold, the second plate defining a second plate channel; and a fin extending between the first plate and the second plate, the fin defining a fin channel fluidly connecting the first plate channel to the second plate channel.

* * * * *